United States Patent [19]

Yuo et al.

[11] Patent Number: 5,264,541
[45] Date of Patent: Nov. 23, 1993

[54] NYLON 6 SYNTHESIS WITH WATER, ALKALI METAL HYPOPHOSHITE CATALYST AND AMINE COCATALYST

[75] Inventors: Wu-Bin Yuo; Shyh-Yang Lee; Mao-Song Lee; Jeng-Yue Wu, all of Hsinchu, Taiwan

[73] Assignee: Industrial Technology Research Institute, Hsinchu, Taiwan

[21] Appl. No.: 948,131

[22] Filed: Sep. 18, 1992

[51] Int. Cl.$^5$ .............................................. C08G 69/20
[52] U.S. Cl. .................................... 528/313; 526/65; 526/66; 528/314; 528/315; 528/318; 528/323
[58] Field of Search ............... 528/313, 314, 315, 318, 528/323; 526/65, 66

[56] References Cited

FOREIGN PATENT DOCUMENTS 48-24517 7/1973 Japan .................................... 528/313

Primary Examiner—Harold D. Anderson
Attorney, Agent, or Firm—W. Wayne Liauh

[57] ABSTRACT

A method for the polymerization of Nylon 6 from caprolactam and water using a catalyst composition comprising a primary catalyst, which can be an alkali metal hypophosphite or an alkali-earth metal hypophosphite, and an amine cocatalyst. The amine cocatalyst can be selected from the group consisting of phenylene diamines, hindered amines, poly(hindered amines), Group I benzotriazoles, and Group II benzotriazoles. The catalyst composition used in this invention is most useful when used in conjunction with the reactive extrusion technology which requires a very fast polymerization rate to take full advantage of this evolving technology.

20 Claims, No Drawings

NYLON 6 SYNTHESIS WITH WATER, ALKALI METAL HYPOPHOSHITE CATALYST AND AMINE COCATALYST

BACKGROUND OF THE PRESENT INVENTION

The present invention relates to a method for the production of Nylon 6 which employs a catalyst composition comprising an alkali metal hypophosphite and an amine compound. More particularly, the present invention relates to a method which utilizes a catalyst composition comprising an alkali metal hypophosphite as the primary catalyst and an amine compound as a cocatalyst, to increase the rate of polymerization of Nylon 6.

Nylon 6 has been widely used as fibers and engineering plastics. In its application as engineering plastics, Nylon 6 can be used for making automobile parts, electric and electronic components, electric wire coatings, tool boxes, and coasters. As fibers, Nylon can be used in making fishing nets, carpets, tires and brushes (including toothbrushes, cosmetic brushes and grinding brushes) as well as stockings.

Nylon 6 can be synthesized using the conventional continuous reaction process, such as the V.K. Tower process, or the reactive extrusion process, which was developed only recently. In reactive extrusion process to synthesize polymers, the extruder is used as a mini-reactor. First, monomers, co-monomers and/or pre-polymers are charged into the extruder. The reactants react inside the extruder to produce the polymer material, which is then extruded from the extruder to provide the final product.

The reactive extrusion technology has the following advantages: First, it provides a high area-to-volume ratio for excellent heat transfer. Second, it provides excellent mixing action during the polymerization reaction. This is particularly advantageous for highly viscous fluids, which can also be transported through the reactor. Third, it can be adapted to provide multiple temperature zones, each having a distinct temperature. Fourth, the reactive extruder can be adapted to provide multiple exhaust or vacuum sections, each vacuum section can have the same or different of vacuum. Fifth, it involves a continuous reaction-extrusion process. Sixth, the resident time involved in the process is very short; therefore, the productivity can be very high per unit time. Seventh, the reactive extrusion process requires a much simpler apparatus than most other conventional commercial reactors. Finally, with the reactive extrusion process, the composition of the feed monomers can be conveniently varied; this greatly enhances the utilization efficiency of the capital investment, and is particularly advantageous for production lines that make relatively small quantities of a large variety of products.

With the above mentioned advantages, the reactive extrusion technology potentially can become one of the best methods to produce polymers and copolymers. However, when the reactive extrusion technology is applied to the polymerization of Nylon 6, current catalyst systems do not provide fast enough reaction rate to take full advantage of this evolving technology. The reaction must be very fast so that the polymerization reaction to make Nylon can be completed in the extruder before they are extruded.

PRIOR ART

Sodium hypophosphite has been widely used as a catalyst for the polymerization of polyamide. For example, Japanese Pat. App. JP 78-62205 discloses a method to make polyamide using sodium hypophosphite as catalyst. Japanese Pat. App. JP 89-179534 discloses the manufacturing of polyamides containing hexamethyleneterephthalamide units using sodium hypophosphite as catalyst. Japanese Pat. App. JP 89-263892 discloses aromatic copolyamides prepared in the presence of sodium hypophosphite.

Polymerization additives containing other than sodium hypophosphite have also been reported. Japanese Pat. App. JP 89-70404 discloses the use of sodium hypophosphite and MeOH during the polymerization of high-molecular weight hexamethylene-terephthalamide polymers. In Japanese Pat. App. 87-28152, the additives further contain alkylenediamine and monocarboxylic acids or primary or secondary monoamines. Canadian Pat. No. 963594 discloses heat-stable nylon 66 fibers with improved dyeability by adding sodium hypophosphite and diphenylamine into the nylon salt solution before polymerization reaction. Japanese Pat. App. JP 89-191926 discloses polyamide compositions with good resistance to flame and heat. Alkaline earth metal hypophosphites are used as catalyst in the polymerization reaction. U.S. Pat. No. 4,113,708 discloses a method using phenylphosphinic acid to reduce the formation of ammonia during the melt preparation of polyamide. Ger. Offen. DE 2158014 discloses a method to stabilize nylon 66 by adding alkali metal hypophosphite into amides and adipate before polymerization. Japanese Pat. Apps. JP 89-179,534 and JP 90-111015 disclose a method for the manufacturing of polyamides by first polymerizing diacids with diamine in the presence of a hypophosphite to give an oligomer then melt polymerizing the oligomer in the presence of a polyethylene was. Great Britain Pat. App. GB 6648485 discloses a heat and light stabilizing additive for polyamide by adding sodium hypophosphite and phenols containing at least one hydrocarbon radical and a radical containing a COOH group or a derivative, to polyamide after or during polycondensation. In Japanese Pat. App. JP 89-212160, the polymerization additives contain manganese hypophosphite, hexamethylenediamine, and triazine compounds, which are added to reactants as fire retardants.

Hypophosphites have also been used as additives to modify the properties of polyamide and/or copolyamide after the completion of the polymerization reaction. U.S. Pat. No. 2,510,777 teaches a modified polyamide having improved stability at elevated temperatures by incorporating into the polyamide a minor amount by weight of hypophosphorous compound. Eur. Pat. App. EP 90-101760 discloses polyamide compositions with improved oxidative stability; the additives disclosed therein including a low-temperature antioxidant from a halogenated hydroxyl ammonium compound, hydrosulfide, bisulfite, phosphorus, and phosphate and a reducing agent from metal hypophosphite and ammonium hypophosphite. Ger. Offen. DE 3636023 discloses a granulated thermoplastics for hot-melt adhesives by mixing copolyamides with refined paraffin and sodium hypophosphite. Japanese Pat. App. JP 85-198900 discloses a polyamide resin composition by blending polyamides with modified polyolefin resins and metal salts of $H_3PO_4$, $H_3PO_3$ and $H_3PO_2$. Japanese Pat. App. JP 81-34897 discloses a method for surface-sensitizing polyamide with sodium hydroxide and sodium hypophosphite. Japanese Pat. App. JP 78-97229 discloses using sodium hypophosphite as a heat stabilizer for copolyamide. Belg. BE 875530 discloses nonflammable polyester, polyamide and polyester-polyamide compositions by mixing polymers or copolymers with phosphinate salts. Japanese Pat. App. JP 90-208135 discloses a polyhexamethyleneadipamide with restricted three-dimensional structure. Copper acetate, potassium iodide or sodium hypophosphite is added to the final polymerized product as stabilizers. Japanese Pat. App. JP 90-116874 discloses mixing of sodium hypophosphite or calcium acid hypophosphite with polyamide, to prevent discolorization. Japanese Pat. App. JP 88-331806 discloses the use of hypophosphorous acid or hypophosphite as anti-coloring agent for polyamide fillers. Japanese Pat. App. JP 88-273376 discloses an injection moulded aliphatic polyamide container comprising a polyamide and additives selected from orthophosphorous acid, hypophosphorous acid, alkali metal salts and alkaline salts. Eur. Pat. App. EP 88-305493 discloses a method by which sodium hypophosphite and a cross-linking agent are added to a linear aliphatic polyamide to improve its melt viscosity.

Examples of prior art literature disclosing the use of reactive extruders include U.S. Pat. No. 4,603,166 which teaches a crystalline polyamide composition prepared from aliphatic diamines and either mixtures of terephathalic acid and adipic acid or mixtures of terephathalic acid, isophthalic acid and adipic acid. Sodium hypophosphite was used as catalyst. Ger. Offen. DE 3605202 discloses a method for making high viscosity polyamide using a twin screw extruder. A prepolymer melt is made to travel through zones of elevated and reduced pressure which undergoes polycondensation in the extruder. In the high pressure zones, the melt is exposed to superheated steam and in the reduced pressure zones, condensation water and steam are removed from the melt.

SUMMARY OF THE PRESENT INVENTION

The main object of the present invention is to develop a method that employs novel catalyst compositions comprising alkali metal hyphosphites as primary catalyst and an amine compound as cocatalysts so that the reaction rate associated with the polymerization of Nylon 6 can be increased over those using prior art catalysts.

The present invention discloses catalyst compositions comprising hypophosphites of alkali metals as primary catalyst and an amine compound as cocatalyst to increase the polymerization rate of Nylon 6. Nylon 6 is polymerized from caprolactam monomer.

The present invention discloses using amine compounds as novel cocatalysts which can be selected from following groups:

1. Phenylene diamine derivatives having the following general structure:

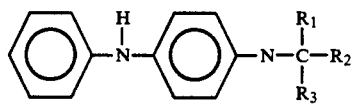

wherein $R_1$, $R_2$ and $R_3$ can be hydrogen or aliphatic groups having 1 to 10 carbons, preferably hydrogen or aliphatic group having 1 to 6 carbons. Examples of these compounds include: N-phenyl-N'-isopropyl-P-phenylene diamine, N-phenyl-N'-(1,3-dimethylbutyl)-p-phenylenediamine, N-phenyl-N'-methyl-p-phenylenediamine, N-phenyl-N'-tert-butyl-p-phenylene diamine, N-phenyl-N'-ethyl-p-phenylene diamine, N-phenyl-N'-octyl-p-phenylene diamine, N-phenyl-N'-decyl-p-phenylene diamine, N-phenyl-N'-isooctyl-p-phenylene diamine, N-phenyl-N'-isodecyl-p-phenylene diamine, N-phenyl-N'-isobutyl-p-phenylene diamine, N-phenyl-N'-(1,4-dimethyl hexyl)-p-phenylene diamine, N-phenyl-N'-(1,4-diethyl hexyl)-p-phenylene diamine, N-phenyl-N'-(1,3-diethyl-butyl)-p-phenylene diamine, and N-phenyl-N'-(1,5-dimethyl-hexyl)-p-phenylene diamine.

2. Hindered amine derivatives having the following general structure:

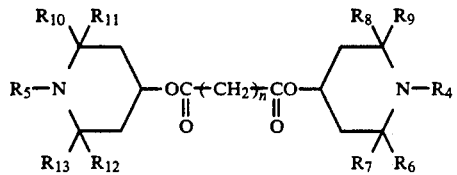

wherein n ranges from 1 to 18, preferably from 2 to 10. $R_4$ through $R_{13}$ can be hydrogen or aliphatic groups having 1 to 10 carbons, preferably hydrogen or aliphatic groups having 1 to 6 carbons. Examples of these compounds include: Bis(1,2,2,6,6-pentamethyl-4-piperidyl)sebacate, Bis(2,2,6,6-tetramethyl-4-piperidyl)sebacate, Bis(2,6-dimethyl-2,6-di-tert-butyl-4-piperidyl)sebacate, Bis(1,2,6-trimethyl-2,6-di-tert-butyl-4-piperidyl)sebacate, Bis(1,2,2,6,6-penta-tert-butyl-4-piperidyl)sebacate, Bis(2,2,6,6-tetra-tert-butyl-4-piperidyl)sebacate, Bis(1,2,2,6,6-penta-methyl-4-piperidyl)adipate, Bis(2,2,6,6-tetra-methyl-4-piperidyl)adipate, Bis(1,2,2,6,6-penta-tert-butyl-4-piperidyl)adipate, Bis(1,2,6-trimethyl-2,6-di-tert-butyl-4-piperidyl)adipate, Bis(2,6-dimethyl-2,6-di-tert-butyl-4-piperidyl)adipate, Bis(2,2,6,6-tetramethyl-4-piperidyl)succinate, Bis(1,2,2,6,6-pentamethyl-4-piperidyl)succinate, Bis(1,2,6-trimethyl-2,6-di-tert-butyl-4-piperidyl)adipate, and Bis(1,2,6-trimethyl-2,6-di-tert-butyl-4-piperidyl)sebacate.

3. Poly(hindered amine) derivatives having the following general structure:

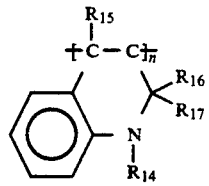

wherein $R_{14}$ through $R_{17}$ are hydrogen or aliphatic groups having 1 to 10 carbons, preferably hydrogen or aliphatic groups having 1 to 6 carbons. Examples of these compounds include: Poly(2,2,4-trimethyl-1,2-dihydroquinoline), Poly(2,2-dimethyl-1,2-dihydroquinoline), Poly(2,4-dimethyl-1,2-dihydroquinoline), Poly(1,2,2,4-tetramethyl-1,2-dihydroquinoline), Poly(1,2,4-trimethyl-1,2-dihydroquinoline), Poly(1-methyl-1,2-dihydroquinoline), Poly(2,2-dimethyl-4-tert-butyl-1,2-dihydroquinoline), and Poly(1-tert-butyl-2,2-dimethyl-1,2-dihydroquinoline).

4. Group I benzotriazole having the following general structure:

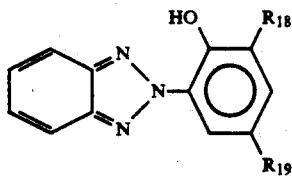

wherein $R_{18}$ and $R_{19}$ are hydrogen or aliphatic groups having 1 to 10 carbons, preferably hydrogen or aliphatic groups having 1 to 6 carbons. Examples of these compounds include: 2-(2-hydroxyl-3-methyl-phenyl)-2H-benzotriazole, 2-(2-hydroxyl-phenyl)-2H-benzotriazole, 2-(2-hydroxyl-5-methyl-phenyl)-2H-benzotriazole, 2-(2-hydroxyl-3,5-dimethyl-phenyl)-2H-benzotriazole, 2-(2-hydroxyl-3,5-diisopropyl-phenyl)-2H-benzotriazole, 2-(2-hydroxyl-3,5-di-tert-butyl-phenyl)-2H-benzotriazole, 2-(2-hydroxyl-3-methyl-5-tert-butyl-phenyl)-2H-benzotriazole, 2-(2-hydroxyl-3,5-diisobutyl-phenyl)-2H-benzotriazole, 2-(2-hydroxyl-3-isopropyl-5-tert-butyl-phenyl)-2H-benzotriazole, 2-(2-hydroxyl-3-tert-butyl-5-isopropyl-phenyl)-2H-benzotriazole, and 2-(2-hydroxyl-3-methyl-5-isopropyl-phenyl)-2H-benzotriazole.

5. Group II benzotriazole having the following general structure:

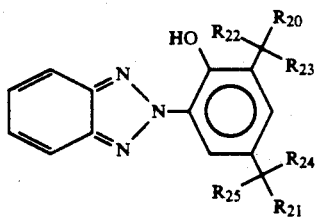

wherein $R_{20}$ and $R_{21}$ are benzene, naphthalene or their derivatives, preferably benzene or derivatives of benzene. $R_{22}$ through $R_{25}$ are hydrogen or aliphatic groups having 1 to 10 carbons, preferably hydrogen or aliphatic groups having 1 to 6 carbons. Examples of these compounds include: 2-[2-hydroxyl-3,5-di-(1,1-dimethyl-benzyl)phenyl]-2H-benzotriazole, 2-[2-hydroxyl-3,5-di-(1-methyl-benzyl)phenyl]-2H-benzotriazole, 2-[2-hydroxyl-3,5-dibenzyl-phenyl]-2H-benzotriazole, 2-[2-hydroxyl-3,5-di-(1,1-diisopropyl-benzyl)-phenyl]-2H-benzotriazole, 2-[2-hydroxyl-3,5-di-(1-isopropyl-benzyl)-phenyl]-2H-benzotriazole, 2-[2-hydroxyl-3,5-di(1,1-di-tert-butyl-benzyl)-phenyl]-2H-benzotriazole, 2-[2-hydroxyl-3-(1,1-di-tert-butyl-benzyl)-5-(1,1-diisopropyl-benzyl)-phenyl]-2H-benzotriazole, 2-[2-hydroxyl-3-(1,1-diisopropyl-benzyl)-5-(1,1-di-tert-butyl-benzyl)-phenyl]-2H-benzotriazole, 2-[2-hydroxyl-3-benzyl-5-(1,1-di-tert-butyl-benzyl)-phenyl]-2H-benzotriazole, 2-[2-hydroxyl-3-(1,1-di-tert-butyl-benzyl)-5-benzyl-phenyl]-2H-benzotriazole, 2-[2-hydroxyl-3-(1-methyl-benzyl)-5-benzyl-phenyl]-2H-benzotriazole, 2-[2-hydroxyl-3-(1-tert-butyl-benzyl)-5-benzyl-phenyl]-2H-benzotriazole, and 2-[2-hydroxyl-3-(1-isopropyl-benzyl)-5-benzyl-phenyl]-2H-benzotriazole.

The present invention will be substantially illustrated in the following examples. It should be noted that these examples are intended only to aid the understanding of this invention; it should further be understood that the scope of this invention, which is intended to be determined by the appended claims, is by no means limited by these examples.

DESCRIPTION OF THE PREFERRED EMBODIMENTS

Example 1 (Preparation of Nylon 6 Prepolymer)

The reactants comprised a predetermined amount of caprolactam, 2 PHR (parts per hundred parts of resin reactants) of water, and 0.1 PHR of sodium hypophosphite. After the reactants were charged into the reactor, nitrogen gas was introduced into the reactor several times to purge air from the reactor. Then the reactor was closed and the temperature of the reactor was maintained at 270° C. for 30 min. During the reaction, if the pressure inside the reactor exceeded 7 Kg/cm$^2$, then the pressure would be released to 3 Kg/cm$^2$. Subsequently, the reactor temperature was reduced to 240° C. and the reactor pressure was released to 0 Kg/cm$^2$, and the material was removed from the reactor. This completed the reaction. After the reaction, Nylon 6 prepolymer was produced which has a relative viscosity of 1.97. The relative viscosity assumed that the viscosity of concentrated sulfuric acid (more than 96%) is 1 g/dl in a Cannon Ubbelohde Size 200 (B194) capillary viscometer at 30° C.

Example 2 (Prior Art)

0.3 g to 0.4 g of the Nylon 6 prepolymer from Example 1 were added into a stainless steel tube reactor. Seal the stainless steel tube reactor, and place the reactor into tin bath at 340° C. for 12 minutes. The internal temperature of the reactor is approximately 260° C. The internal pressure of the reactor is approximately 73 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 6 polymer. Measure the relative viscosity of the sample. The relative viscosity of the polymer is 3.93.

Example 3 (This Invention)

Prepare the Nylon 6 prepolymer which is synthesized according to the method described in Example 1, and all the reaction conditions are the same as those in Example 2, except that 0.5 PHR various types of amine compounds were added into the reactor. The compositions of the amine cocatalysts are listed in Table 1. After the reaction is completed according to the method described in Example 2, the relative viscosity is measured. The product is a Nylon 6 polymer.

The relative viscosities of reaction products from Examples 1 through 3 are listed in Table 2. The relative viscosities of the Nylon 6 polymers that are synthesized using an amine compound as cocatalyst are higher than those without the amine cocatalyst, indicating a more complete reaction within the same reaction time by the addition of the amine compound cocatalyst disclosed in this invention.

TABLE 1

| Example No. | Amine Cocatalyst Composition | Commercial Name |
| --- | --- | --- |
| 3-A | N-phenyl-N'-(1,3-dimethyl butyl)-p-phenylene diamine | Forte 6C |
| 3-B | Bis (2,2,6,6,-tetramethyl-4-piperidyl) sebacate | Tinuvin 770 |
| 3-C | Bis (1,2,2,6,6-pentamethyl-4- | Tinuvin 292 |

TABLE 1-continued

| Example No. | Amine Cocatalyst Composition | Commercial Name |
|---|---|---|
| 3-D | piperidyl) sebacate Poly(2,2,4-trimethyl-1,2-dihydroquinoline) | Forte RD |
| 3-E | 2-[2-hydroxyl-3,5-di-(1,1-dimethyl-benzyl)phenyl]-2H-benzotriazole | Tinuvin 900 |
| 3-F | 2-(2-hydroxyl-5-methyl-phenyl)-2H-benzotriazole | Tinuvin C |

TABLE 2

| Example No. | Polymer Composition | Relative Viscosity |
|---|---|---|
| 1 | Nylon 6 prepolymer | 1.97 |
| 2 | Nylon 6 polymer (w/o cocatalyst) | 3.93 |
| 3-A | Nylon 6 polymer (with amine compound) | 4.64 |
| 3-B | Nylon 6 polymer (with amine compound) | 4.31 |
| 3-C | Nylon 6 polymer (with amine compound) | 4.81 |
| 3-D | Nylon 6 polymer (with amine compound) | 4.32 |
| 3-E | Nylon 6 polymer (with amine compound) | 4.79 |
| 3-F | Nylon 6 polymer (with amine compound) | 4.45 |

Example 4 (Preparation of Nylon 6 Prepolymer)

The reactants and reaction conditions were the same as those in Example 1, except that the reaction was maintain at 270° C. for 20 minutes, instead of the 30 min as in Example 1. The relative viscosity of the Nylon 6 prepolymer was 1.82.

Example 5 (Prior Art)

Grind the Nylon 6 prepolymer from Example 4 into powders, and feed the powder into a twin screw extruder (W & P ZSK 30 model, with a diameter of 30 mm and an L/D of 27). Then extrude the reactants. The conditions of extrusion are described in the following paragraph.

The reaction temperatures are 265° C. in the first section, 280° C. in the second, third, and fourth sections, and 270° C. in the fifth section. The temperature of the die is 270° C. The pressure in the fourth section is 72 cm Hg (76 mm Hg being absolute vacuum). The rotation speed of the screw is 100 rpm, representing an average resident time of about two minutes.

Example 6 (This Invention)

The reactants are Nylon 6 prepolymer from Example 4 and 0.3 PHR of Bis (2,2,6,6,-tetramethyl-4-piperidyl)-sebacate, Tradename Tinuvin, a hindered amine compound. All the other conditions are the same as those in Example 5. The relative viscosities of reaction products from Examples 4 through 6 are listed in Table 3. The relative viscosities of the Nylon 6 polymer that was synthesized using the amine compound as cocatalyst higher than that without the amine compound cocatalyst.

TABLE 3

| Example No. | Polymer Composition | Relative Viscosity |
|---|---|---|
| 4 | Nylon 6 prepolymer | 1.82 |
| 5 | Nylon 6 polymer (w/o cocatalyst) | 2.28 |
| 6 | Nylon 6 polymer (with amine compound) | 2.56 |

From all the tables shown above, it is evident that the addition of amine compound as a cocatalyst, in the presence of a primary catalyst, increases the rate of polymerization of Nylon 6.

What is claimed is:

1. A method for the preparation of Nylon 6 comprising the steps of:
    (a) charging predetermined amounts of caprolactam, water, and a primary catalyst, which comprises an alkali metal hypophosphite, and an amine cocatalyst into first reactor;
    (b) said amine cocatalyst being selected from the group consisting of phenylene diamines, hindered amines, and benzotriazoles;
    (c) purging air from said first reactor;
    (d) closing said first reactor and maintaining inner temperature of said first reactor to 240° C. to 300° C. for 10 to 60 minutes;
    (e) reducing said temperature to between approximately 200° C. and 250° C.;
    (f) releasing pressure and removing prepolymer from said first reactor;
    (g) charging said prepolymer into a second reactor;
    (h) sealing said second reactor and placing said second reactor into a thermal bath at 240° C. to 340° C. for 10 to 20 minutes; and
    (i) removing said second reactor from said thermal bath and cooling said second reactor to obtain said Nylon 6 polymer.

2. The method of claim 1 wherein the amount of said primary catalyst is 0.01 to 5 parts per one hundred parts of caprolactam.

3. The method of claim 1 wherein the amount of said amine cocatalyst is 0.01 to 5 parts per one hundred parts of caprolactam.

4. The method of claim 1 wherein the amount of said amine cocatalyst is 0.1 to 3 parts per one hundred parts of caprolactam.

5. The method of claim 1 wherein said alkali metal hypophosphite is sodium hypophosphite.

6. The method of claim 1 wherein said phenylene diamines are represented by the following formula:

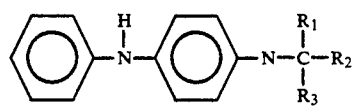

wherein $R_1$, $R_2$, and $R_3$ are, independently, selected from the group consisting of hydrogen or aliphatic radicals containing 1 to 10 carbons.

7. The method of claim 6 wherein $R_1$, $R_2$, and $R_3$ are, independently, selected from the group consisting of hydrogen or aliphatic radicals containing 1 to 6 carbons.

8. The method of claim 1 wherein said hindered amines are represented by the following formula:

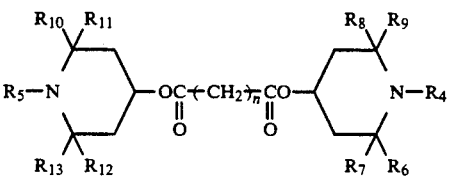

wherein n is an integer from 1 to 18, and through $R_4$ through $R_{13}$ are, independently, selected from the group consisting of hydrogen or aliphatic radicals containing 1 to 10 carbons.

9. The method of claim 8 wherein n is an integer from 2 to 10.

10. The method of claim 8 wherein $R_4$ through $R_{13}$ are, independently, selected from the group consisting of hydrogen or aliphatic radicals containing 1 to 6 carbons.

11. The method of claim 1 wherein said amine cocatalyst is added only during step (g) after said caprolactam has reacted in the presence of said primary catalyst and water to form Nylon 6 prepolymers.

12. The method of claim 1 wherein said second reactor is a twin screw extruder reactor.

13. The method of claim 1 wherein said second reactor is a twin screw extruder reactor operating at a vacuum of 72 cm Hg and a rotational speed of 100 rpm.

14. The method of claim 1 wherein said hindered amines are poly(hindered amines) which are represented by the following formula:

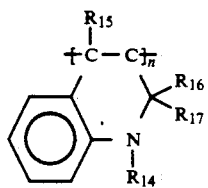

wherein $R_{14}$ through $R_{17}$ are, independently, selected from the group consisting of hydrogen and aliphatic radicals containing 1 to 10 carbons.

15. The method of claim 1 wherein said benzotriazoles are represented by the following formula:

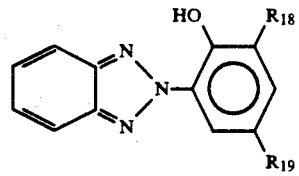

wherein $R_{18}$ through $R_{19}$ are, independently, selected from the group consisting of hydrogen and aliphatic radicals containing 1 to 10 carbons.

16. The method of claim 1 wherein said benzotriazoles are represented by the following formula:

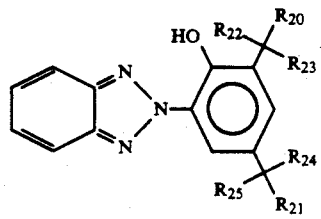

wherein $R_{20}$ through $R_{21}$ are, independently, selected from the group consisting of phenyl, naphthyl and derivatives thereof; $R_{22}$ through $R_{25}$ are, independently, selected from the group consisting of hydrogen and aliphatic radicals containing 1 to 10 carbons.

17. The method of claim 14 wherein $R_{14}$ through $R_{17}$ are, independently, selected from the group consisting of hydrogen and aliphatic radicals containing 1 to 6 carbons.

18. The method of claim 15 wherein $R_{18}$ through $R_{19}$ are, independently, selected from the group consisting of hydrogen and aliphatic radicals containing 1 to 6 carbons.

19. The method of claim 16 wherein $R_{20}$ and $R_{21}$ are, independently, selected from the group consisting of phenyl and derivatives of phenyl.

20. The method of claim 16 wherein $R_{22}$ through $R_{25}$ are, independently, selected from the group consisting of hydrogen and aliphatic radicals containing 1 to 6 carbons.

* * * * *